AMPLITUDE MODULATION OF MAGNETRONS

Filed Jan. 25, 1950 5 Sheets-Sheet 1

INVENTOR
John S. Donal, Jr.
BY Harry Tenicke
ATTORNEY

Dec. 2, 1952 J. S. DONAL, JR 2,620,467

AMPLITUDE MODULATION OF MAGNETRONS

Filed Jan. 25, 1950 5 Sheets-Sheet 2

INVENTOR
John S. Donal, Jr.
BY [signature]
ATTORNEY

Dec. 2, 1952 J. S. DONAL, JR 2,620,467

AMPLITUDE MODULATION OF MAGNETRONS

Filed Jan. 25, 1950 5 Sheets-Sheet 3

INVENTOR
John S. Donal, Jr.
BY Harry Tunick
ATTORNEY

POWERS WITH HALFWAVE TRANSFORMER

INVENTOR
John S. Donal, Jr.
BY Harry Tunick
ATTORNEY

Dec. 2, 1952 J. S. DONAL, JR 2,620,467

AMPLITUDE MODULATION OF MAGNETRONS

Filed Jan. 25, 1950 5 Sheets-Sheet 5

INVENTOR
John S. Donal, Jr.
BY Saury Tunick
ATTORNEY

Patented Dec. 2, 1952

2,620,467

UNITED STATES PATENT OFFICE 2,620,467

AMPLITUDE MODULATION OF MAGNETRONS

John S. Donal, Jr., Princeton, N. J., assignor to Radio Corporation of America, a corporation of Delaware Application January 25, 1950, Serial No. 140,415

27 Claims. (Cl. 332—5)

This invention relates to amplitude modulation, and more particularly to circuit arrangements for the amplitude modulation of ultra-high-frequency oscillators of the magnetron type.

In the present invention, the magnetrons are cathode-modulated in order to produce amplitude modulation of the outputs thereof. One application of such magnetrons is in the transmission of television (TV) programs; in such application, the modulation applied or fed to the cathodes of the magnetrons would be the video modulation corresponding to a TV picture. The modulator is connected in series in the cathode circuit, so that the magnetrons may be said to be anode-modulated.

An object of this invention is to devise arrangements for increasing the depth of amplitude modulation obtainable with magnetrons, to a value desired and required for TV service.

Another object is to increase the efficiency of magnetron amplitude modulation systems.

A further object is to devise a system for reducing at higher modulation frequencies the frequency or phase variations or deviations of the magnetron resulting from variations of magnetron anode current during the modulation cycle.

A still further object is to provide means for correcting distortion due to the curvature of the magnetron anode modulation characteristic.

Yet another object is to provide a scheme for in effect reducing the frequency variations of the magnetron with variations in magnetron anode current during the modulation cycle.

The foregoing and other objects of the invention will be best understood from the following description of some exemplifications thereof, reference being had to the accompanying drawings, wherein.

The objects of this invention are accomplished, briefly, in the following manner: A magnetron has a series modulator connected to its cathode, modulating signals being applied to such modulator. This magnetron has one or more so-called "FM guns" therein, by means of which the magnetron frequency may be varied over a certain range. A phase comparison and phase control circuit including a reference oscillator has its output connected to the control grid of the FM guns, to maintain the magnetron frequency equal to that of the reference oscillator and at a predetermined phase relation thereto. A signal derived from the modulating or video chain is applied to the control grids of the FM guns, in the proper phase and with the proper shape to reduce the phase or frequency deviations which appear at the higher modulation frequencies, this signal being applied essentially in parallel with the output of the phase comparison and phase control circuit. The magnetron can be slightly decoupled from its load to further reduce such phase or frequency deviations and to increase the depth of modulation obtainable. In a modification, an absorption tube is coupled to the magnetron, this tube being turned on as the bottom of the modulation cycle, or the minimum output power, is approached, to further reduce the output power of the magnetron, thus increasing the depth of modulation. In another modification, two magnetrons connected to a common output load or antenna are anode-modulated cophaseally, and their relative phases are also varied oppositely by the modulating signal to vary the resultant power supplied to the antenna, to increase the efficiency of the system. In still another embodiment, a low-power magnetron is maintained always in phase opposition to the main high power magnetron, these two tubes being connected to a common antenna, thereby reducing the output power at the bottom of the modulation cycle and increasing the depth of modulation. According to still another embodiment of this invention, an absorption tube or an absorption gun in the main magnetron is used to absorb power in order to straighten the modulation characteristic, thus correcting distortion arising during anode modulation.

Figure 1:
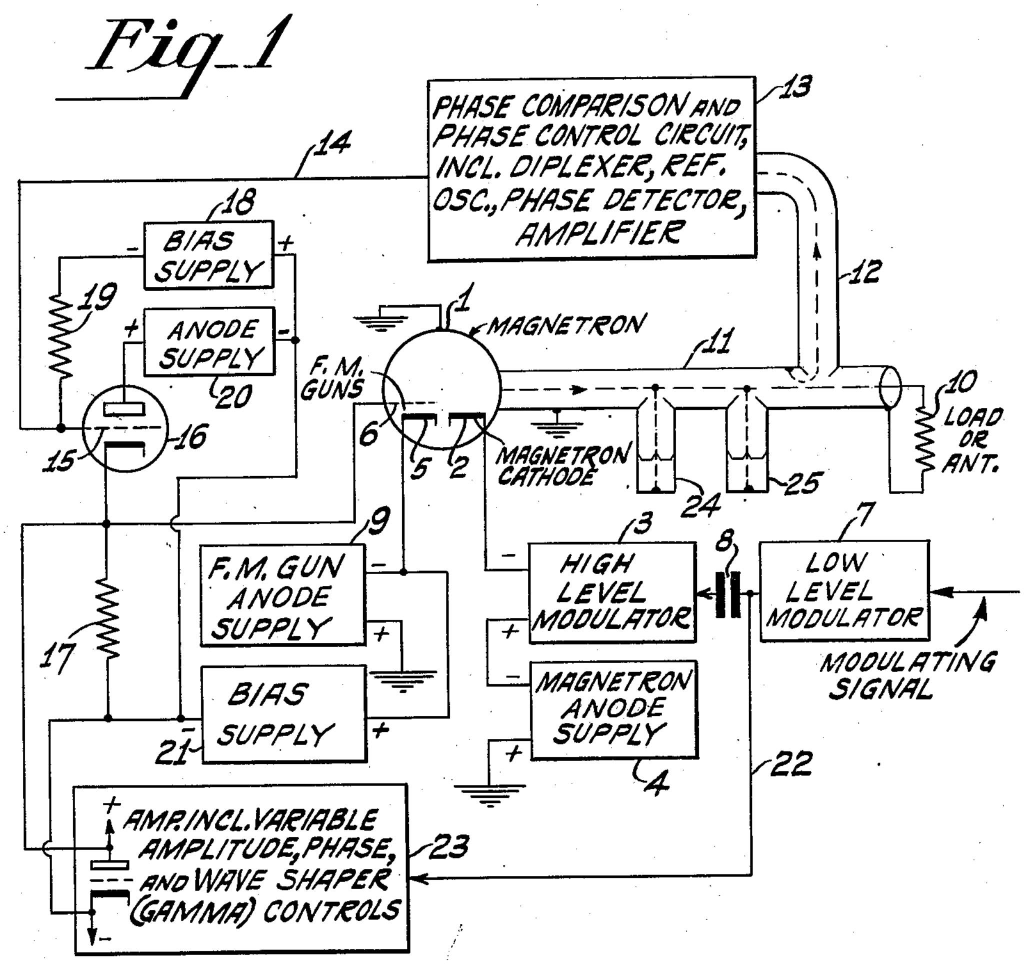
Fig. 1 is a diagrammatic representation of one system according to this invention.

Now referring to the drawings, and more particularly to Fig. 1 thereof, magnetron 1 has a conventional cathode 2 (the outer shell or anode of the magnetron being grounded as shown) which is connected through a high level modulator 3 to the negative terminal of a high voltage anode supply 4 the positive terminal of which is grounded as indicated. A modulating signal, such as a TV video signal, is fed into a low-level modulator 7 which is essentially an amplifier, and is then fed through a coupling condenser 8 to the high level modulator 3 the output of which is coupled to cathode 2. Thus, it may be seen that the modulator 3 is connected in series in the cathode circuit of magnetron 1, so that such magnetron may be considered to be anode-modulated. Because the cathode, of necessity, is in the anode circuit, the modulator 3 is, in effect, in the anode-cathode circuit. If the R. F. voltage across the magnetron load be plotted against voltage at the magnetron cathode, the curve so obtained shows evidence of saturation, but the use of a series modulator 3 (which has a characteristic of slope opposite to that of such curve) tends to straighten this curve or characteristic. The characteristic of the cascaded final modulator stage 3 and the magnetron 1 is reasonably linear, the use of a series modulator to correct linearity of the modulation characteristic therefore being quite desirable.

As a typical example, the magnetron 1 may be mechanically tunable over a range from about 725 to 890 megacycles and may have a rated power output of one kw. for continuous service at an efficiency of 50 to 60 per cent. The voltage of anode supply 4 may be 2500 volts. The modulating signal input to modulator 7 may have an amplitude of 1–2 volts peak-to-peak, the output signal of this modulator being on the order of 10 volts peak-to-peak. The output signal of modulator 3 may be 200 volts peak-to-peak, so that the cathode 2 may have an operating potential of −2300 to −2500 volts with respect to the zero voltage level or ground, anode supply 4 and modulator 3 being connected to each other with the polarities indicated.

The magnetron 1 has embodied therein a plurality of frequency control means known as "FM guns," only one of which is indicated in Fig. 1, but each of which consists of an electron-emitting cathode 5 and an electron flow control element or grid 6. The electron beams from these guns are projected by means of a gun anode supply 9 the negative terminal of which is connected to cathode 5 and the positive terminal of which is grounded, through cavity resonators which are integral with the cavity resonators of the magnetron 1. Control of the energy of the electron beams from cathodes 5, by the application of a suitable bias voltage between cathodes 5 and grids 6, provides variable shunt reactance for the frequency determining parameters of the magnetron; in this way the output frequency of magnetron 1 is controlled. For a more complete disclosure of such frequency control means, reference is made to the co-pending Smith application, Serial No. 563,732, filed November 16, 1944, now abandoned.

Continuing with the example previously begun, the magnetron 1 is frequency modulated or controlled, by the beams from cathodes 5, which are grid-controlled spiral electron beams traversing the resonant cavities of the magnetron, over a total range of 6–8 megacycles.

These FM guns or frequency control guns are used to phase-lock the tube 1 to a reference crystal-controlled oscillator in a manner to be described. Magnetron 1 feeds a suitable load 10, which may, for example, be a transmitting antenna, by means of a feed line 11 which may be a coaxial line. A small portion of the output of magnetron 1 is taken off by a transmission line 12 and fed to a phase comparison and phase control circuit 13, which includes a diplexer, a source of crystal-controlled oscillations, a phase detector and an amplifier. In the unit 13, the frequency and phase of the magnetron output are compared with the frequency and phase of the reference crystal-controlled oscillator, and an amplified voltage appears on output lead 14 whenever the magnetron frequency differs from the reference oscillator frequency and/or whenever the relative phase of the magnetron output has other than a predetermined value. For a more complete description of the phase comparison and phase control circuit 13, reference is made to the copending Bond et al. application, Serial No. 130,964, filed December 3, 1949.

The output lead 14 of unit 13, as disclosed in said Bond et al. application, is connected to the grid 15 of a triode 16 connected as a cathode follower amplifier stage, a cathode resistor 17 being connected between the cathode of tube 16 and a point of fixed potential, in the usual manner. Bias supply 18 has the positive terminal thereof connected to the lower end of resistor 17 and its negative terminal connected to grid 15 through a resistor 19, to provide proper grid bias for the cathode follower stage. An anode supply 20 furnishes anode potential for tube 16.

The upper end of load resistor 17 is connected directly to the control elements or grids 6 of the FM guns in magnetron 1, while the lower end of such resistor is connected through a suitable bias voltage supply 21 to the cathodes 5 of such guns. In this way, the voltage across load resistor 17 is effectively applied between the cathodes 5 and control elements 6 of the FM guns as a variable or controllable bias voltage for such guns, to produce changes in output frequency of magnetron 1 in response to the appearance of a voltage across resistor 17. The output of the unit 13 may consist of alternating or direct voltages or both, as set forth in the aforementioned Bond et al. application, and these voltages appearing across resistor 17 control, by means of the FM guns, the output frequency of magnetron oscillator 1 to maintain it exactly equal to the reference oscillator frequency and at a fixed relative phase (such as 90°, for example), therewith.

During the amplitude modulation cycle there is a variation of magnetron frequency with magnetron anode current (herein termed "pushing"). As the anode current increases, the magnetron frequency also increases due to the usual "pushing." If this is not corrected, at least to some degree, there may be adjacent channel interference, multipath difficulties, trouble with receivers, etc. As may be seen from Fig. 1, a feedback loop including the magnetron 1, the phase comparison circuit 13 and the cathode follower stage 16, is established to control the frequency of oscillation of the magnetron. The phase shift or phase modulation due to "pushing," present with amplitude modulation, has been reduced to about ±18° at low modulation frequencies by using increased gain in the amplifier included in unit 13. However, this requires careful adjustment to prevent oscillation or "singing" in the feedback loop. In fact, while the characteristics of the locking system described (including unit 13) result, theoretically, in a phase deviation or phase modulation independent of modulation frequency, yet because of phase shift in the amplifier of unit 13 at high modulation frequencies the gain of the feedback loop (and hence the FM control) must be tapered off to unity at approximately 1.5 megacycles, to prevent such singing. Therefore, at this modulation frequency and above, phase modulation will be the same as it would be without the phase-locking FM gun control. In other words, the phase-locking system including unit 13 has the property that for "pushing" frequency changes produced at low modulation rates the correction of frequency and phase is excellent, but for frequency changes produced at high modulation rates the frequency correction, in particular, is comparatively poor.

Figure 2:
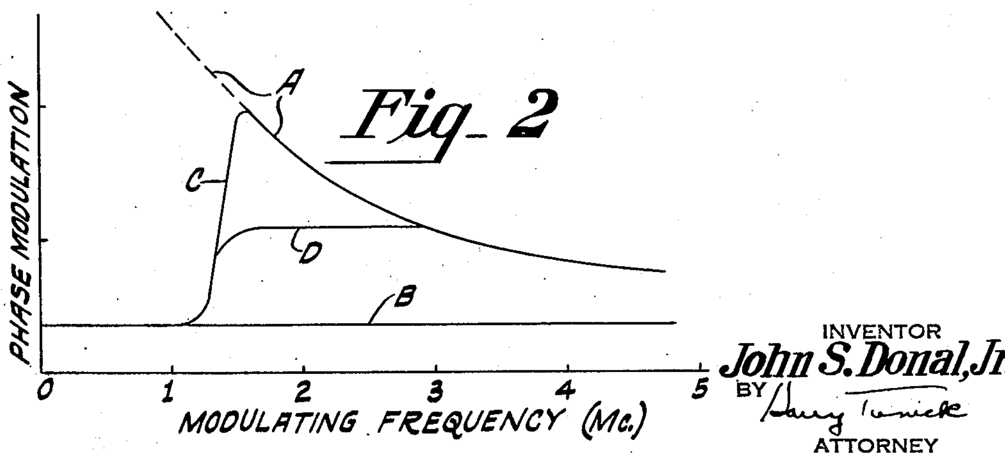
Fig. 2 is a set of curves useful in explaining the operation of the system of Fig. 1.

The above will become somewhat clearer from a study of Fig. 2. In this figure, phase modulation of the magnetron output is plotted against modulating frequency. Curve A represents the uncontrolled phase modulation due to "pushing," that is, with unit 13 out of the picture; this curve indicates that the phase modulation varies more or less inversely with modulating frequency. The frequency deviation due to the "pushing" is assumed to be substantially independent of the modulation rate; hence, from the well-known expression $$\Delta\phi=\frac{\Delta f}{fm}$$

(see Terman, Radio Engineers' Handbook, first edition, 1943, page 585, equation 29), the phase deviation or phase modulation may be expected to be inversely proportional to the modulation rate or modulating frequency, as represented by curve A, Fig. 2.

The ideal condition, indicated by curve B, is one in which the phase deviation or phase modulation is constant throughout the range of modulation frequencies. Curve C indicates qualitatively the results obtained when the phase-locking system including unit 13 is in the circuit; this curve follows the "ideal" curve B at frequencies below a value of approximtely 1.5 megacycles, while above this value follows the "uncontrolled" curve A.

According to one aspect of this invention, a correction signal derived from the modulator is applied through a compensating network (to make such correction signal of the proper phase, amplitude and wave shape) directly to the grids of the FM guns, in parallel with the phase-locking system output voltage, to reduce the phase deviation at the higher modulating frequencies, thus at least partially correcting the frequency changes due to anode modulation of the magnetron. By means of coupling lead 22, a signal is derived from the output of the low level modulator 7, prior to coupling condenser 8, and is applied to the input of an amplifier 23. By means of said amplifier, the signal can be adjusted in volume or amplitude, phase, and shape ("gamma"), the shaping being employed should a signal linearly proportional to the video modulating signal not produce the desired result. The signal appearing in the output of amplifier 23 can be made effective over a reasonable range of modulation frequencies.

As indicated in Fig. 1, the resistor 17 previously described is made to serve also as the output or anode load resistor of the final stage of amplifier 23, in order to apply the correction signal derived from the modulator 7 directly to the grids 6 of the FM guns, in parallel with the output voltage of the phase-locking system, which voltage also appears across resistor 17, as previously described.

The correction signal applied from the output of amplifier 23 to FM gun grids 6 may be made of the proper phase, amplitude and shape to at least partially, if not completely, correct the frequency changes due to "pushing" during the amplitude modulation cycle. The results may then be as indicated by curve D in Fig. 2; this curve represents results which might be obtained when a signal derived from the modulator is applied to the grids of the FM guns in parallel with the output voltage of the phase-locking system. It may be seen from Fig. 2 that curve D (as compared to curve C) more nearly approaches the "ideal" curve B, in which the phase deviation is constant throughout the entire range of modulation frequencies.

Phase relations will now be considered. In a system according to this invention which has actually been built and tested, and which was referred to proviously, a high voltage at the output of modulator 7 (or at the input of modulator 3) results in high power or high amplitude output of the magnetron 1. Also, as previously stated, such high power (high anode current in the magnetron) gives higher output frequency due to "pushing." To tend to correct this higher frequency, the frequency of the magnetron needs to be lowered or reduced, and this is brought about by high voltage on the FM gun grids 6, corresponding to high FM gun current. Since at this instant high voltage is needed on grids 6, and is also produced at the output of modulator 7 (input to amplifier 23), phase conditions are proper to correct the frequency and/or phase changes due to "pushing" during the amplitude modulation cycle, and there should be no phase reversals in amplifier 23.

Any amplitude modulation resulting from the action of the FM guns merely adds to or subtracts from the desired amplitude modulation, and account can be taken of any non-linearity by the shaping circuits in amplifier 23.

Slow changes in frequency of the magnetron, due to changes in temperature, loading, voltage, etc., may be controlled by utilizing the resultant bias on the FM gun grids 6 (this bias being produced in part, as previously described, by comparison of the magnetron frequency with a reference or master frequency in unit 13) to control a motor which drives the mechanical tuner in magnetron 1. By use of this expedient, it would not be necessary for the FM guns to have sufficient range to compensate for rather large slow changes, in addition to rapid changes. In general, it will be desirable to employ a combination of phase-locking (by unit 13, etc.), signal derived from video modulating signal (by unit 23, etc.), and compensation of slow changes (by a tuning motor), in order to control and correct the frequency of magnetron 1.

A magnetron used experimentally for this invention is described more fully in the copending Donal et al. application, Serial No. 757,756, filed June 28, 1947, which application ripened on December 19, 1950, into Patent #2,534,503, as well as in Proceedings of the IRE, volume 35, pages 664–669 (July 1947).

Figure 3:
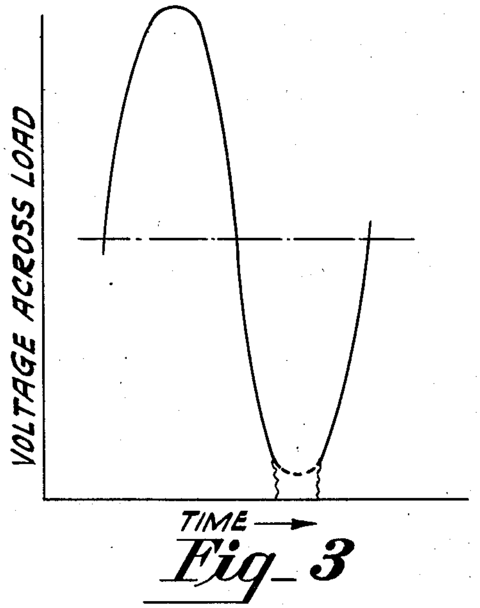
Figs. 3 and 4 are curves illustrating difficulties overcome by the present invention.
Figure 4:
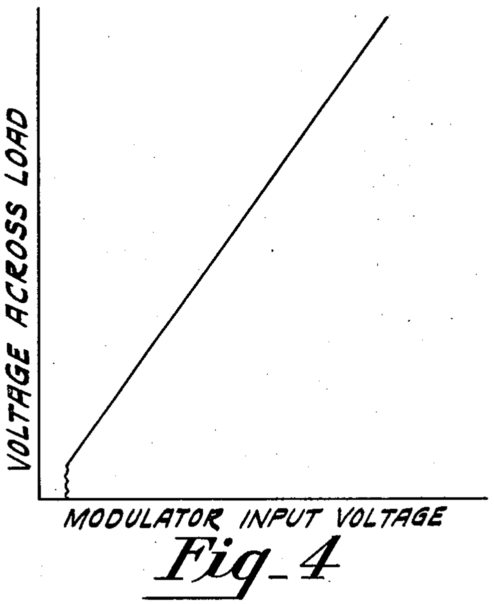

For TV service, a rather large depth of modulation is required. Present standards require that, for the amplitude modulated video signal, the voltage for "white" be 15 per cent of that for the synchronizing pulse peaks. In other words, there should be a reduction in voltage from the synchronizing pulse peaks of 85 per cent for "white." In magnetrons, the depth of modulation is limited by a mode-shift or cessation of oscillation at the low-power end of the modulation characteristic. The effect on the modulation envelope is shown, for 60-cycle modulation as an example, in Figs. 3 and 4. In these figures, the mode-shift at the low-power or low-voltage end of the load voltage curves is indicated by discontinuities in the curves. At any modulation frequency above a few cycles per second, the mode-shift occurs at a somewhat lower level than is the case in static measurements. In the average tube of the exemplary type hereinbefore mentioned, the mode-shift occurs at such a power level that modulation 85 per cent down in voltage from the peaks is attainable when the peak power is 1.5 kw. or above. No upper mode boundary has been encountered, at least at peak powers below 2.5 kw., except during exhaust; in this case, the presence of gas brings the upper mode boundary down to about the 1 kw. output level.

Now referring again to Fig. 1, magnetron 1 is connected to load 10 by means of appropriate matching units 24 and 25, here shown as double-stub tuners in feed line 11. The impedances of units 24 and 25 may be adjusted in a well-known manner. Said impedances are preferably adjusted to "decouple" the magnetron slightly from the normal matched load; in other words, said impedances are so adjusted or varied as to make the resultant or apparent load on magnetron 1 of somewhat higher resistance than that of the ordinary matched load. It has been found, according to this invention, that decoupling the tube 1 slightly from the normal load in the described manner reduces the lower boundary (that is, the voltage level at the lower end of the modulation characteristic at which a mode-shift occurs) by as much as a factor of two. In this way, the depth of modulation possible is increased. It has also been found, according to this invention, that this slight decoupling decreases the "pushing" which occurs in the magnetron.

Figure 5:
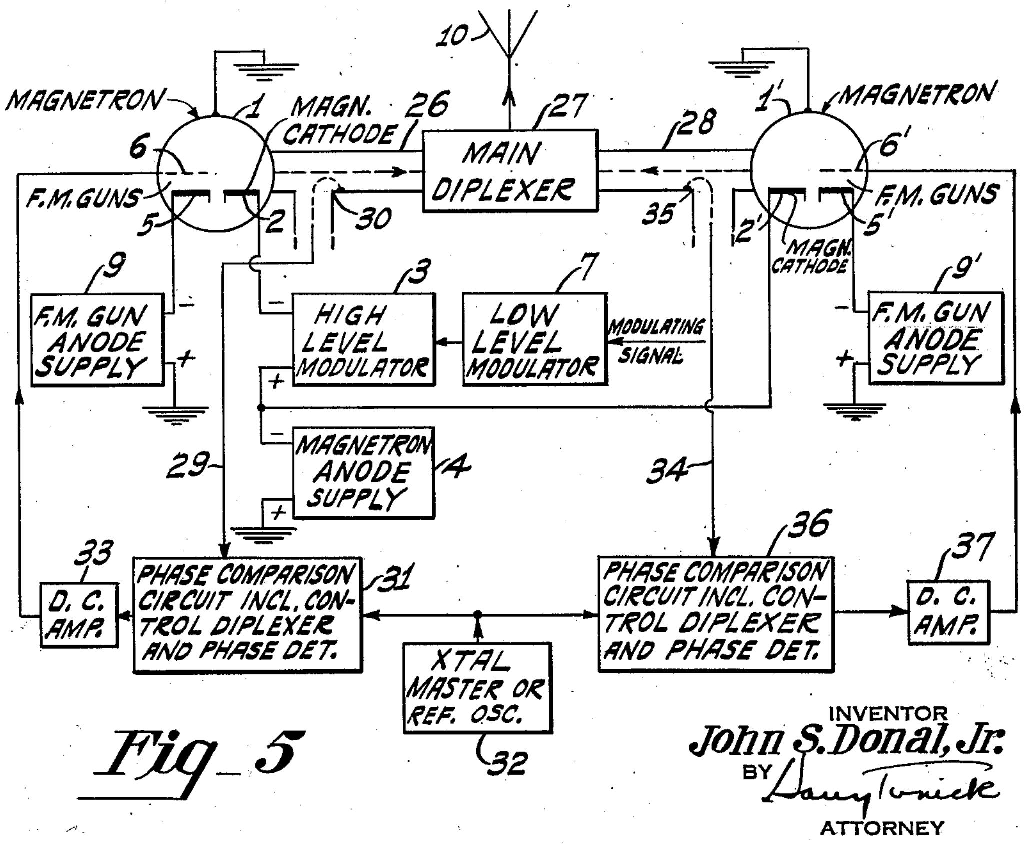
Figs. 5 and 6 are diagrammatic representations of modified systems according to this invention.

As previously explained, there are occasions when sufficient depth of modulation for conventional broadcasting or communication services (and particularly for TV service) is not attainable by modulation of the anode voltage of magnetrons in the conventional manner. Fig. 5 discloses an arrangement whereby the attainable depth of modulation may be increased to that necessary or desired. In this figure, elements or units the same as those of Fig. 1 are denoted by the same reference numerals. The main magnetron 1 is anode modulated by means of a series modulator 3 connected to its cathode, in the same manner as in Fig. 1. The R. F. output from magnetron 1 is applied by means of feed line 26 to the main diplexer 27 (the necessity for which will later become apparent. The output of which is fed to antenna 10.

Let it be assumed that anode modulation of the magnetron 1 is used to reduce the power output thereof from 1,000 watts to 40 watts. This corresponds to only 80% reduction in voltage from the peaks, and is insufficient for TV practice. In order to increase the depth of modulation attainable, an auxiliary magnetron 1', of small output power compared to that of magnetron 1, is utilized, tube 1' being maintained always in phase opposition to the main tube 1. Magnetron 1' is similar in construction to magnetron 1, so that the reference numerals of corresponding electrodes are primed for magnetron 1'. In order to effectively oppose the power outputs of tubes 1 and 1' in antenna 10, tube 1' has its output coupled to main diplexer 27 by means of feed line 28. Diplexer 27 functions to couple the two inputs thereto (from tubes 1 and 1') to the common antenna 10 as an output load, while at the same time preventing any undue interaction between tubes 1 and 1' themselves through their common load. A diplexer which is operative to perform this function, though at somewhat decreased efficiency, is disclosed in the copending Brown application Serial No. 52,635, filed October 4, 1948, which ripened into Patent No. 2,602,887 on July 8, 1952.

Tube 1' is of sufficient power capacity to increase the depth of modulation to that necessary. In the example previously given, a 20-watt magnetron would increase the voltage reduction (from the peaks) to more than 85%. The 20 watts would, of course, be subtracted from the total output power at all modulation levels, thus reducing slightly the power at the peaks of the modulation cycle; however, this reduction would amount to only 20 watts and would be inconsequential as compared to the 1,000-watt output power of magnetron 1 at such peaks.

The small magnetron 1' is not anode-modulated, so the cathode 2' thereof is connected to the negative side of anode potential supply 4, the anode of magnetron 1' being grounded as is the positive terminal of supply 4.

There remains to be described the method of locking the outputs of the small tube 1' and of the large tube 1 out of phase or in phase opposition. For this purpose, a portion of the R. F. output of magnetron 1 is taken off by means of a transmission line 29, which is coupled to feed line 26 at point 30, and is applied to a control diplexer in unit 31. Unit 31 is somewhat similar to unit 13 in Fig. 1 in that the former includes a diplexer the outputs of which are fed to a phase detector. For phase comparison purposes, a portion of the output of a crystal master or reference oscillator 32 is also fed to the control diplexer in unit 31, in the manner previously described in connection with Fig. 1 and as fully described in the aforementioned Bond et al. application. The output of unit 31 is fed through a D. C. amplifier 33 to the control grid 6 of the FM guns in magnetron 1, to control the output frequency of such magnetron. Similarly, a portion of the R. F. output of magnetron 1' is taken off by means of a transmission line 34, which is coupled to feed line 28 at point 35, and is applied to a control diplexer in unit 36. Unit 36 may be and preferably is exactly similar to unit 31. The remaining portion of the ouput of reference oscillator 32 is fed to the control diplexer in unit 36. The output of unit 36 is fed through a D. C. amplifier 37 to the control grid 6' of the FM guns in magnetron 1', to control the output frequency of such magnetron. Although they are not shown in Fig. 5, it is to be understood that a cathode follower stage, such as stage 16 of Fig. 1, is utilized between each of the amplifiers 33 and 37 and the corresponding FM gun grids 6 and 6'.

For static phase lock, that is, under unmodulated conditions, the outputs of units 31 and 36 are each zero when the R. F. from the master oscillator 32 and the R. F. from the corresponding magnetron (1 or 1') are 90° out of phase at the control diplexer in the respective unit. This is in accordance with the disclosure in the aforementioned Bond et al. application. Therefore, the phase of either magnetron at its "control"

diplexer is fixed relative to the phase of the master oscillator output at the same place, but the phase of either magnetron at its R. F. output line (26 or 28) is a function of the R. F. line length (from point 30 to 31's diplexer or from point 35 to 36's diplexer) to the control diplexer. Hence, the phase of either magnetron at the "main" diplexer 27 is a function of the R. F. line length to the corresponding control diplexer. Therefore, the relative phase of the two magnetrons at the main diplexer is a function of the lengths of line 29 or 34.

To adjust for the desired 180° phase difference between the two magnetron outputs at antenna 10, the length of lines 29 and/or 34 is varied to get minimum antenna power. Thereafter, by operation of the units 31 and 36, the magnetrons 1 and 1′ are locked out of phase or in phase opposition at antenna 10.

Figure 6:
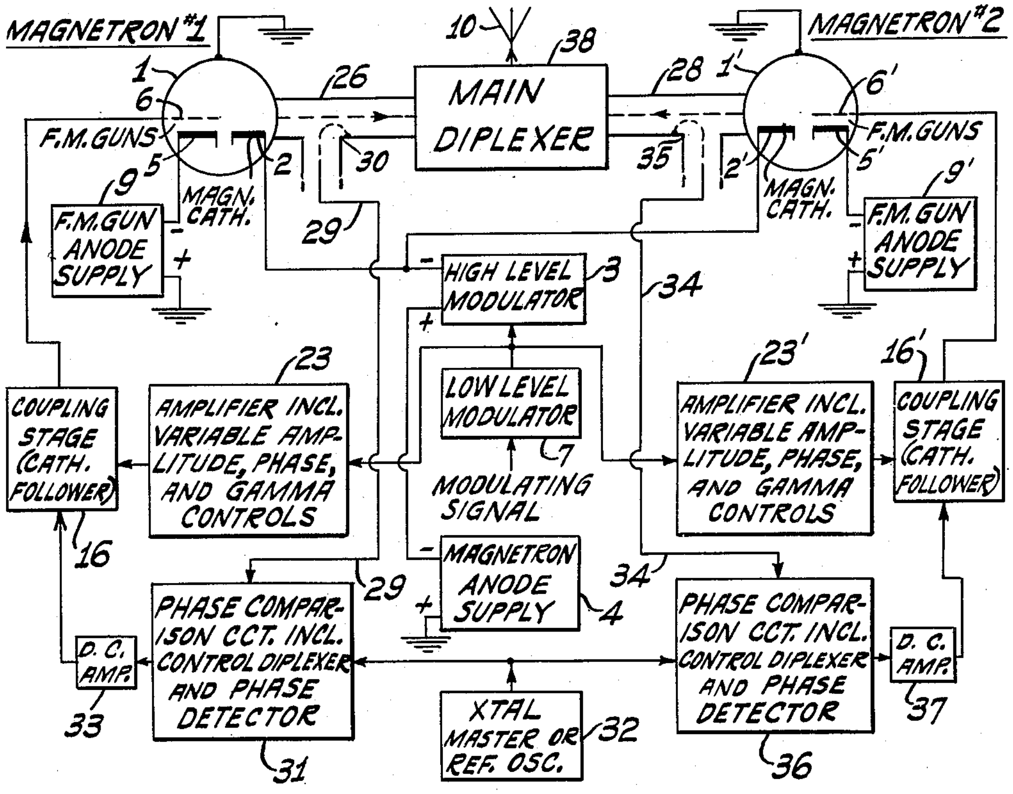

Fig. 6 discloses another arrangement whereby the attainable depth of modulation may be increased to that necessary. In this figure, two magnetrons 1 and 1′, constructed as previously described in connection with Figs. 1 and 5, but which have substantially equal output powers and substantially similar characteristics, have their outputs connected, by means of feed lines 26 and 28, respectively, to a main diplexer 38 the output of which is fed to a common output load or antenna 10. Diplexer 38 is of a suitable type for effecting combination of the two inputs thereto in a common output load, while preventing undue interaction between the two R. F. sources feeding such diplexer. The diplexer 38 may be, for example, of the type disclosed in the aforementioned Brown application.

Tube 1 may be termed "magnetron #1," while tube 1′ may be termed "magnetron #2," for purposes of discussion. Both magnetrons #1 and #2 are anode modulated for purposes of amplitude modulation, and to effect this result cathodes 2 and 2′ are both connected to the negative output side of high level modulator 3; modulator 3 is thus a series modulator in the anode circuits of both magnetrons.

Using the same arrangement as previously described in connection with Fig. 5, including elements 26 and 28—37, inclusive, the relative phase of the two magnetrons #1 and #2 is adjusted to have a value of 90° at "main" diplexer 38 by variation of lengths of R. F. lines 29 and 34. As described in connection with Fig. 1, cathode follower coupling stages 16 and 16′ are used between the outputs of the D. C. amplifiers 33 and 37 and the respective FM gun grids 6 and 6′. It will be recalled that the description of Fig. 5 applied to the static or unmodulated condition. Thus, the phases of the outputs of magnetrons #1 and #2 at the main diplexer 38, for the unmodulated condition, are as represented by the vector diagram of Fig. 7; these two outputs are seen to have a relative phase of 90° or a phase difference of 90°.

Figure 7:
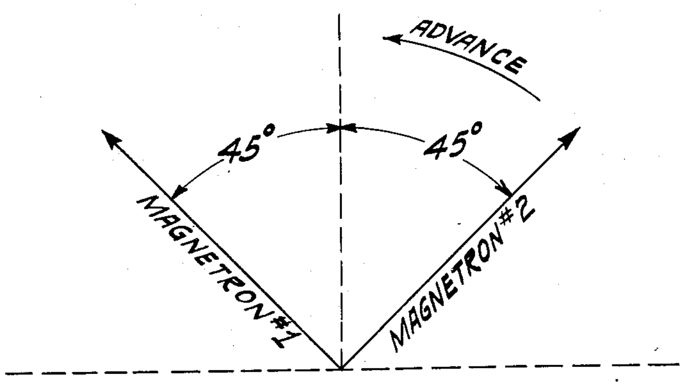
Fig. 7 is a vector diagram useful in explaining the operation of Fig. 6.

Magnetrons #1 and #2 are in effect connected in parallel to supply a common load 10. It has been found, according to this invention, that the depth of modulation attainable by anode modulation of the two magnetrons, by means of the connections to modulator 3 previously described, in some cases is inadequate, or in other words, is sometimes not as much as is necessary for some purposes. Therefore, according to this invention, the phases as depicted in Fig. 7 are varied by modulation so that the R. F. powers add or subtract in the antenna; when the magnetrons are modulated down in power by the anode modulation the phases of the two magnetron outputs are varied so as to have a relative phase of 180° and when the magnetrons are modulated up in power by the anode modulation the phases of the two magnetron outputs are varied so as to have a relative phase of zero degrees. This is known as outphase modulation of the two magnetrons and the manner in which it is effected will become clearer as the description proceeds. Thus, Fig. 6 discloses a combination of amplitude modulation and out-phase modulation of two magnetrons. If the depth of modulation from either out-phase modulation or anode modulation is inadequate, the other modulation helps increase such depth.

Referring again to Fig. 7, as magnetron #2 is modulated down in power or amplitude by anode modulation, its output frequency drops or decreases due to "pushing"; hence its phase lags, the amount of phase lag being independent of the modulation rate, since such magnetron is phase-controlled or phase-locked by means of unit 36, etc. As an example, this phase lag might be about 20°, but a lag of 45° is wanted in order to bring the phase of the magnetron #2 output down to the horizontal base line in Fig. 7 (since, as previously stated, it is desired to have a relative phase of 180° between the two magnetron outputs when they are modulated down in power or amplitude). Under these conditions, a phase advancement of 45° is needed to bring the magnetron #1 output down to the horizontal base line.

In order to increase the phase lag of magnetron #2 to the desired 45° under these conditions, a signal from the modulator 7 is passed through an amplifier 23′ of several stages (to give gamma control, amplitude control and phase control, as in the amplifier 23 of the Fig. 1 compensation system) and is applied to the grids 6′ of the FM guns in magnetron #2, through the instrumentality of the cathode follower coupling stage 16′, somewhat in the manner disclosed in Fig. 1. This signal is used to reduce the frequency of magnetron #2 still more and to cause its phase to lag more, to about 45° as desired. Since to lower or reduce the output frequency of magnetron #2 a positive or high voltage is required at the FM gun grids and since this is required when the voltage at the input of modulator 3 (output of modulator 7) is low or negative to modulate the magnetron down in power, the signal applied to such grids is the reverse of the compensation or correction signal as described in connection with Fig. 1. Therefore, this consideration should be kept in mind when designing amplifier 23′, in order to have the appropriate number of stages therein for proper relation between the polarities of the grid signal voltage and the modulation voltage.

As magnetron #1 is modulated down in power by anode modulation (it may be seen that the two magnetrons are anode modulated simultaneously and in phase), its output frequency also drops or decreases due to "pushing," giving a phase lag of about 20°, for example. Since at this moment (bottom of the amplitude modulation cycle) an advance of 45° is wanted to bring the phase of the magnetron #1 output down to the horizontal base line in Fig. 7, the signal at its FM gun grids 6 must not only overcome this phase lag due to "pushing" but must also cause the phase to advance about 45°. Since magnetron #1 must be advanced in phase and magnetron #2 must be retarded in phase by the modulating signal, such signal must modulate the two magnetrons oppositely in timing or phase.

In order to overcome this phase lag of magnetron #1 and to cause the phase thereof to advance about 45° under these conditions, a signal from the modulator 7 is also passed through an amplifier 23, which is essentially similar to amplifier 23' previously described, and is applied to the grids 6 of the FM guns in magnetron #1, through the instrumentality of the cathode follower coupling stage 16. This signal applied to grids 6 is made of such amplitude and phase as to increase the frequency of magnetron #1 sufficiently not only to counteract the phase lag thereof due to "pushing," but also to cause a phase advancement of approximately 45° therein, as is desired.

Thus, by the apparatus described, a relative phase of substantially 180° is brought about between the two magnetron outputs at the bottom of the modulation cycle.

When magnetron #2 is modulated up in power, "pushing" causes the frequency thereof to rise or increase; hence its phase advances, and such advancement may be about 20°, for example. At this moment, the peak of the modulation cycle, the signal from modulator 7 acts through circuit 23' to increase the frequency of magnetron #2 still more, this signal therefore being used to advance the phase of magnetron #2 more, to about 45°. Considering again Fig. 7, since at the peak of the modulation cycle it is desired to have a relative phase of zero degrees between the two magnetron outputs, an advancement of the phase of magnetron #2 is needed to bring magnetron #2 output up to the vertical line, while a lag of phase of magnetron #1 is needed to bring magnetron #1 output to the vertical line. When magnetron #1 is modulated up in power, "pushing" causes a phase advancement thereof, of about 20°, for example. The signal from modulator 7 acts through circuit 23 at this moment (peak of modulation cycle) to lower or decrease the frequency of magnetron #1 sufficiently to overcome the phase advancement due to "pushing" and also to cause a phase lag of magnetron #1 output of about 45°, as is desired.

Thus, a relative phase of substantially zero degrees is brought about between the two magnetron outputs at the peak of the modulation cycle.

As may be seen from the foregoing description, in Fig. 6 anode modulation of the two magnetrons reduces the total power in antenna 10 at the same time that the signals to the FM gun grids increase the phase difference between the two magnetrons, and increases the total power in said antenna at the same time that the signals to the FM gun grids decrease the phase difference between the two magnetrons. Thus, the power inputs are reduced at the point in the modulation cycle when the power is dissipated in a resistance (in main diplexer 38) and is hence unusable, with the result that the efficiency of the system is increased from an average value, over the modulation cycle, of about 26 per cent to more nearly 40 per cent, assuming the magnetrons themselves have an efficiency of 50 per cent.

Another advantage of the Fig. 6 system, previously stated, is that if the depth of modulation from either out-phase modulation or from anode modulation is inadequate, the other modulation helps increase such depth.

Also, shaping the envelope of the modulation voltage applied to the magnetrons, thus controlling the modulation characteristic of the anode modulation, can correct deviations from linearity (or poor shape) of the out-phase modulation characteristic.

As to voltages necessary at the FM gun grids, take the case of magnetron #2. Suppose we want to advance the phase of an uncontrolled magnetron (i. e., one with no phase-locking system) by 10° at a modulation rate of 1 mc. $\Delta f = f \times \Delta\phi = (1)\ (0.17) = .17$ mc., since 10° equals .17 radian. Suppose this takes 1 volt on the FM gun grids. But, suppose that the compression ratio of the locking system 34, 36, 32, etc., is ten at 1 mc., which means that 10 volts must be applied to the grids to get one volt actually effective. If the locking system is working according to theory and the modulation rate used is far from the "singing" frequency, the locking system will permit a phase deviation, during modulation, which is independent of modulation rate. In a particular experimental case, this permitted deviation was 20°. It is a function of the gain of the loop. If we want to advance the phase 25°, in addition to the 20° permitted by the locking system, we need 2.5 times 10, or 25 volts, at the grids.

It is assumed that the phase shift around the loop of the phase-locking system is linearly proportional to the modulation frequency (i. e., constant time delay). The loop gain should then be proportional to $1/f$, as a fundamental property of such circuits. The loop gain is usually denoted by $\mu B$ and the compression ratio is equal to $1-\mu B$ where this is a vector difference. The "Nyquist" diagram is next used to get the vector difference, but when the gain is high $\mu B$ is much larger than unity, so the compression ratio is proportional to $\mu B$ and proportional to $1/f$. This is true only at modulation rates well below the "singing" frequency, but that condition is assumed.

Now, the $\Delta f$ needed to change the phase drops as the modulation rate drops, in the uncontrolled case, since $\Delta f = f \times \Delta\phi$. Thus, to advance the phase 10° at 0.1 mc., we need only $\frac{1}{10}$ volt uncontrolled. But the compression ratio of the locking system is proportional to $1/f$, and would be 100 at 0.1 mc., instead of 10, as it is at 1 mc. Therefore, the actual voltage necessary at 0.1 mc. is 100 times $\frac{1}{10}$ or 10 volts again, or 25 volts for 25°. Thus, we see that the voltage necessary at the grids is independent of the modulation rate.

In the case of magnetron #1, if the phase lags 20° and we want it to advance 45°, we have to advance it 65° and for this we need $$\frac{65}{10} \times 10$$

or 65 volts, instead of 25 volts. The same voltage will be required if we want its phase to lag 45°.

It may be seen that for magnetron #2 the gain of its locking system can be reduced to a point such that the tube lags 45° instead of 20° when modulated down in power, and advances 45° instead of 20° when modulated up in power. In this case, no signal from the modulator to the grids is necessary if the locking system has a true characteristic of constant $\Delta\phi$.

We may assume that if the gain of the locking system is reduced, the compression ratio is reduced in the same ratio; thus, instead of 10 at 1 mc. we would have $^{20}/_{45}$ times 10 or about 4.5. Therefore, in a case in which we have to change phase, we would need 4.5 volts per 10° instead of 10 volts. In the case of magnetron #1, if we reduce the gain of its locking system so that it lags 45° when we want it to lead 45°, we must advance it a total of 90°. Needing 4.5 volts per 10°, for 90° we would need about 41 volts. Thus, it appears that the second case, in which the gain of the locking systems is reduced, is better all around.

In practice, however, if the magnetron lags 45° in phase due to modulation down, it would not advance 45° in phase for modulation up, since "pushing" is less for an upward swing. So, we would need some extra signal to make it lead or advance 45°. In general, then, "pushing" is non-linear and so is the control characteristic of the FM guns, so the grid signal would have to be shaped considerably, in addition to its basic amplitude adjustment.

Just as in the case of the compensation in Fig. 1, the phase of the signal at the FM gun grids must be properly adjusted. In Fig. 1, the phase of the correction signal must bear a proper relation to that of the "pushing." In Fig. 6, the phase adjusting signal at the FM grids must have the proper phase relation to the R. F. phase deviation to give the desired altered phase deviation.

Figure 8:
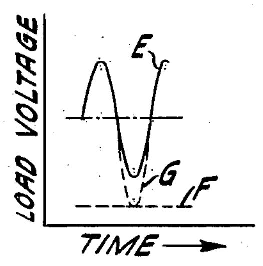
Figs. 8 and 9 are modulation characteristics useful in connection with the explanation of Fig. 10.

As previously stated herein, anode modulation of a magnetron may be used to vary the power output thereof, but for a particular tube this method might result in a depth of modulation which is limited to about an 80% reduction in voltage from the peaks; this is insufficient for TV practice. Suppose the solid line sine wave E in Fig. 8 is a reproduction of a sine-wave modulating voltage, but the modulation is not deep enough. Assume that we want to modulate down to the voltage level F. This can be done by extending the sine wave as at G. In the modulation characteristic representation of Fig. 9, this is equivalent to turning H into J. The modulation characteristic of Fig. 9 must be made sufficiently straight, the criterion probably being a change of slope no greater than a factor of two.

Figure 10:
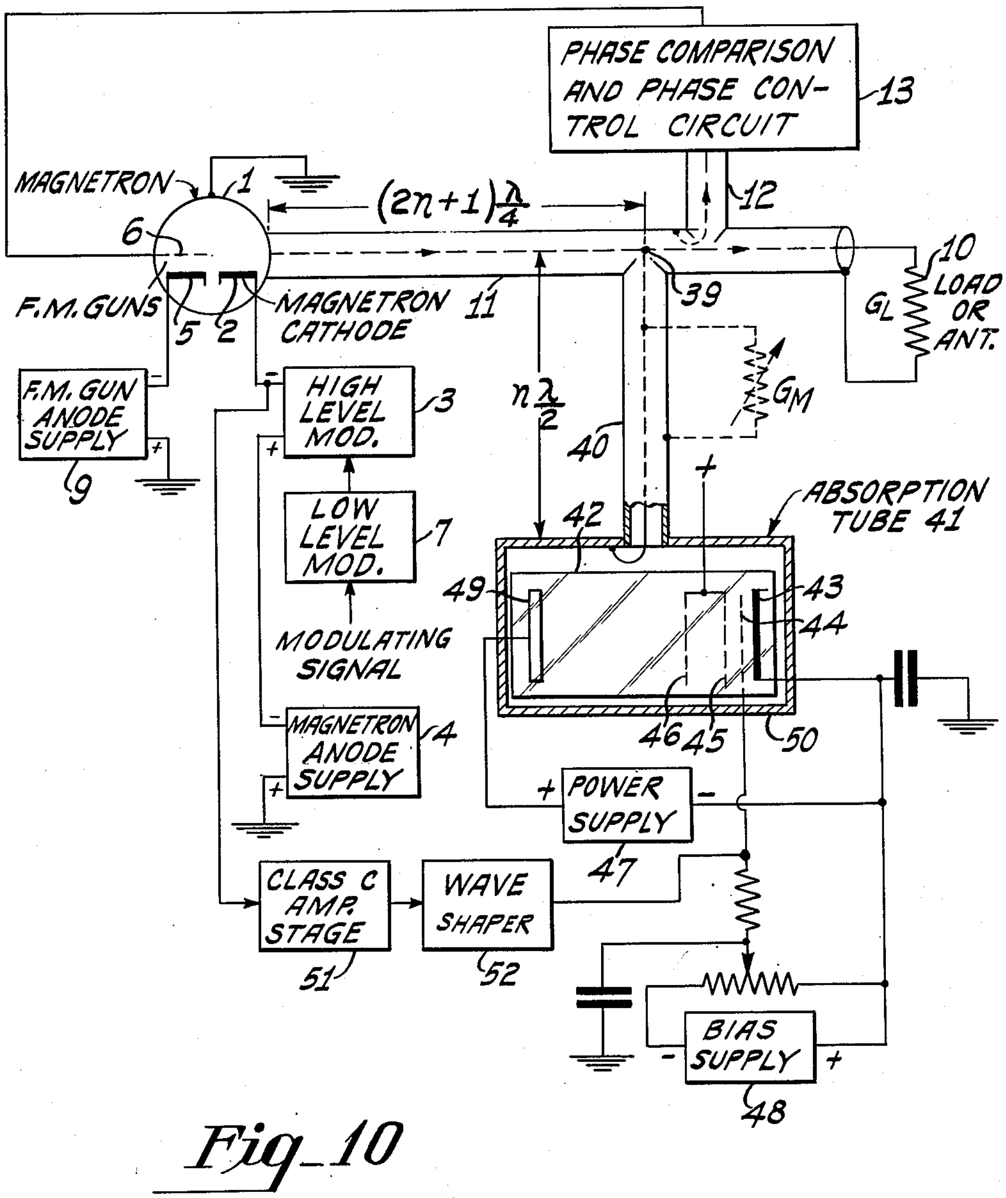
Fig. 10 is a diagrammatic representation of a modified system.

Let it be assumed that anode modulation of the magnetron 1 in Fig. 10 is used to reduce the power output thereof from 1,000 watts to 40 watts. This corresponds to 80% reduction in voltage from the peaks, and is insufficient for TV practice. Now referring to Fig. 10, the output of magnetron 1 is coupled to load or antenna 10 by means of transmission line 11 as in Fig. 1, a portion of the output energy being taken off by means of line 12 and used for frequency control or phase-locking of the magnetron by means of unit 13 and the FM guns, as in Fig. 1. The antenna 10 is represented by a resistance of conductance $G_L$. At junction point 39, which is preferably spaced an odd integral number of quarter-wavelengths along transmission line 11 from the magnetron 1, one end of an absorption branch transmission line 40 is connected to the main line. Line 40 is an integral number of half-wavelengths long, as indicated, so that this line may be termed a half-wave transformer. Branch line 40 extends to, and is terminated by, the resonant cavity of a spiral electron beam tube 41 the beam of which is subjected to a strong magnetic field whose axis is parallel to the axis of the spiralling beam. The oscillatory energy generated by magnetron 1 is coupled by means of line 40 to the resonant circuit or cavity of tube 41 and is absorbed in amounts depending upon the conductance $G_M$ of the spiral beam tube, which in turn is directly proportional to the beam current in such tube; therefore, tube 41 may be termed an absorption tube.

The spiral beam absorption tube 41 consists essentially of a resonant cavity containing a grid-controlled modulating electron beam which is caused to describe a spiral path in such cavity. The absorption tube 41, represented somewhat schematically in Fig. 10, may comprise an evacuated envelope 42 enclosing an electron beam gun comprising a thermionic cathode 43, a control grid 44, a screen grid 45 and an anode 46. The electron gun elements are suitably biased, by means including in part a positive potential supply 47 and a grid bias supply 48, to project the electron beam to a positively biased collector electrode 49. Grid bias supply 48 provides a negative bias potential on control grid 44. The evacuated envelope is surrounded by a coaxial cavity resonator 50 to which branch line 40 is suitably coupled. An absorption tube of this type is more fully described in the copending Donal et al. application, Serial No. 757,755, filed June 28, 1947, which ripened on July 1, 1952 into Patent 2,602,156.

The conductance $G_M$ can be made to be directly proportional to the electron beam current in the absorption tube 41, so that said conductance increases as the beam current increases. The absorption tube beam current may be effectively controlled by means of a suitable voltage applied to control grid 44 thereof.

Figure 11:
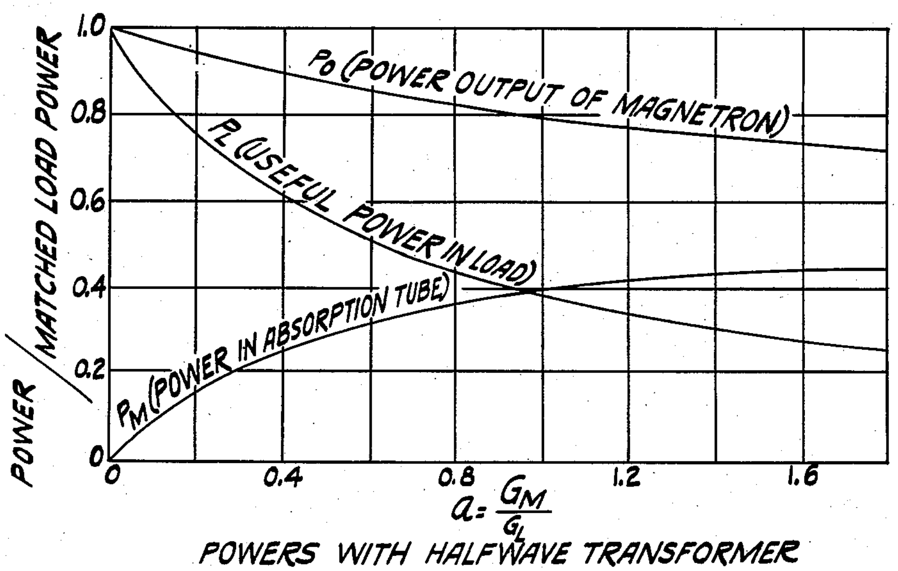
Fig. 11 is a set of curves useful in explaining the operation of Fig. 10.

To increase the depth of modulation according to the arrangement of Fig. 10, the beam in the absorption tube 41 is biased on only during the lower portion of the plate modulation cycle, the beam being off during the remainder of such cycle. Fig. 11 is a set of curves useful in explaining the operation of the invention of Fig. 10. With the absorption tube beam off, the losses in the absorption tube 41 will represent a value of "$a$" of from .01 to .04 and the system power output will be about 93 to 97% of that without the absorption tube, as may be seen from the curve labeled $P_L$ in Fig. 11. Very little power will be absorbed in the latter tube. When minimum load voltage (F in Fig. 8) is approached, the absorption tube gun is biased on to complete the modulation cycle. From Fig. 11, a beam current such that $a=1$ (absorption tube presents same conductance as the assumed 50-ohm conductance of the load) will result in an additional reduction of system power output to about .38/.95 of the assumed 40 watts, or to 16 watts. This, however, corresponds to a total reduction of the original 1,000 watts to 13% in voltage, which is more than sufficient for TV purposes since a reduction to 15% is required. This example shows that the method is quite practical. Still more beam current would reduce the load power still further. If an "$a$" of one is sufficient, a higher beam current could be used but the absorption tube could be decoupled to decrease the "$a$" due to losses, resulting in less reduction of the useful power output when the absorption tube beam is off.

The results obtained by biasing on the beam in absorption tube 41 only during the lower portion of the plate modulation cycle have just been explained. There will now be explained, with reference to Fig. 10, a circuit arrangement whereby the absorption tube beam may be biased on only during the lower portion of the modulation cycle. Basically, a signal is taken from the output of modulator 3 and is to be applied to the absorption tube grid 44, this signal being made to be, in first approximation, of the correct phase at such grid. Here it should be noted that the voltage at the input of modulator 3 (output of modulator 7) is negative or low for low magnetron output power, so this voltage would be of improper phase to be applied directly to the absorption tube grid, since for low magnetron output a positive voltage should be applied to such grid in order to turn the absorption tube on. Therefore, this voltage if used would have to be inverted or reversed in phase by the time it reaches the absorption tube grid.

The signal is taken from the output of the high level modulator 3 and is fed through a class C amplifier stage, which may consist of one tube biased beyond cut off, so that it conducts only during the positive portions of the amplitude modulation cycles fed thereto, and, moreover, only adjacent the peaks of these portions. If the D. C. bias on this class C stage is very low, no signal would get through this tube at all. As the bias is increased, the signal peaks get through. This bias should be variable so enough of the peak can be passed to actuate the absorption tube grid during that portion of the cycle desired (to give J of Fig. 9). It might be better, however, to vary the magnitude of the signal reaching the grid of this amplifier stage tube by means of a potentiometer on its input, so as to be able to vary the bias independently and make the combination thus do a little shaping too.

It should be noted that the positive swings at the magnetron cathode (low power end of the modulation cycle) pass through amplifier stage 51, which reverses the phase, making it incorrect for the grid of the absorption tube 41. The signal appearing at the output of amplifier stage 51 is fed to a wave shaping stage 52, to adjust the shape of the modulation characteristic. This stage also inverts the phase of the signal to make it roughly of correct phase again.

Due to delays in units 51 and 52, the signal at the absorption tube 41 may be delayed with respect to the signal at the magnetron input, particularly as the modulating frequency increases. However, the modulation on the RF magnetron output also begins to lag, due to the bandwidth characteristic of the magnetron. These delays or lags will tend to match each other, but not perfectly. Therefore, at any one modulating rate the phase of the signal on the absorption tube grid should be made to match the phase of the RF modulation envelope. This can be done by a phasing circuit. Ideally, it should be such as to match the phases over as broad a band of modulating frequency as possible.

Such a phasing circuit could be, for example, a rather simple RC coupling circuit connected between the input potentiometer of amplifier stage 51 (previously referred to) and the grid of the tube constituting this stage. The R of this coupling circuit could be made variable to shift the phase. Variation of this R would also vary the amplifier gain, but this can be compensated by variation in the gain control at the input potentiometer. If it is desired to adjust the phase in the opposite direction, an inductance L can be substituted for the C of the RC phasing circuit. In general, the C or L of the phasing circuit can be chosen to have any convenient value, and then the R should be chosen to have a resistance several times the reactance of C or L at the frequency under consideration. It is best to first match the phase curves of the magnetron and of 51, 52 as well as possible over as wide a range as possible.

The signal at the output of wave shaper 52 is applied to control grid 44 of the absorption tube 41, this signal being of the proper (positive) polarity to bias the beam on in this tube at the lower end of the modulation cycle E in Fig. 8, $G_M$ being increased when the current of the absorption tube beam increases. Thus, by the operation previously described, the absorption tube 41, used in the above manner, increases the depth of modulation of magnetron 1, as is desirable.

If necessary, other stages may be added between modulator 7 and control grid 44 for further wave shaping or for more amplitude, keeping the required basic phase relation correct.

Figure 9:
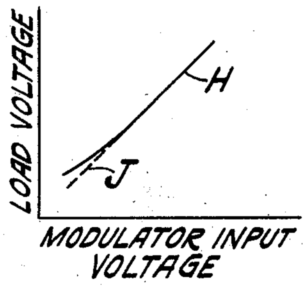

The improvement of modulation depth discussed in connection with Fig. 10 could be considered an example of correction of shape of the amplitude modulation characteristic during plate modulation, if the curve H of Fig. 9 had originally been turned up at the bottom.

Figure 12:
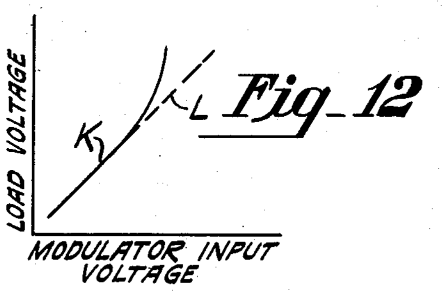
Fig. 12 is a set of curves useful in explaining a modification.

As another simple example of correction of shape of the amplitude modulation characteristic by means of an absorption tube, now refer to Fig. 12. Suppose that the characteristic of the magnetron during anode modulation had the shape represented by non-linear curve K (which turns upwardly at its upper end), and suppose that the linear characteristic L is wanted. To effect this correction, the Fig. 10 arrangement can be used, with the difference that the first approximation to the correct phase of the signal at the absorption tube grid is that existing at the input of modulator 3, so one stage less than used in Fig. 10, is needed for this correction, whether the signal is derived from the input or output of modulator 3. In other words, again a tube is biased beyond cut off and only the top of the modulation signal passes therethrough to be effective on the absorption tube grid. For Fig. 12, as the most elementary case, an amplifier different from amplifier 51 should be used.

Although Fig. 10 shows a separate absorption tube, it is desired to be made clear at this juncture that guns in the magnetron 1 itself can be used to absorb power, in order to perform the same functions as those performed by tube 41. These absorption guns should preferably be in addition to those denoted by 5, 6, etc. (which are employed for frequency correction) and could be operated with a different magnetic field if desired, as disclosed in the aforementioned Donal et al. application, Serial No. 757,755, now Patent No. 2,602,156, issued July 1, 1952.

What is claimed is:

1. In combination, an electron discharge device of the magnetron type having voltage-responsive frequency controlling means coupled thereto, a low level modulator and a high level modulator in cascade coupled to the anode circuit of said device, means for applying a modulating signal to the low level modulator to vary the anode curent of said device to amplitude modulate the output thereof, means coupled to the output of one of said modulators for deriving a voltage of modulation frequency therefrom, and means for applying said voltage to said frequency controlling means to oppose the output frequency changes of said device produced by variations in the anode current thereof.

2. In combination, an electron discharge device of the magnetron type, a modulator coupled to the anode circuit of said device, means for applying a modulating signal to said modulator to vary the anode current of said device to amplitude modulate the output thereof, a matched load coupled to the output of said device by means of a coaxial transmission line, and a stub tuning device in said line for varying the effective impedance thereof to decouple to a controlled extent said device from said load.

3. In combination, an electron discharge device of the magnetron type, variable-impedance power absorbing means coupled to the output of said device, a modulator coupled to the anode circuit of said device, means for applying a modulating signal to said modulator to vary the anode current of said device to amplitude modulate the output thereof, and means responsive to said modulating signal for reducing the effective impedance of said absorbing means, to thereby increase the power absorbed by such absorbing means, only in response to the appearance at said device of modulating signal amplitudes below a predetermined amplitude.

4. In combination, an electron discharge device of the magnetron type, a useful load coupled to the output of said device, variable-impedance power absorbing means coupled to the output of said device in parallel to said load, a modulator coupled to the anode circuit of said device, means for applying a modulating signal to said modulator to vary the anode current of said device to amplitude modulate the output thereof, and means responsive to said modulating signal for reducing the effective impedance of said absorbing means, to thereby increase the power absorbed by such absorbing means and to reduce the power supplied to said load, only in response to the appearance at said device of modulating signal amplitudes below a predetermined amplitude.

5. In combination, an electron discharge device of the magnetron type, an absorption-type tube coupled to the output of said device, said tube having therein a voltage-responsive electrode for controlling the effective impedance thereof, a modulator coupled to the anode circuit of said device, means for applying a modulating signal to said modulator to vary the anode current of said device to amplitude modulate the output thereof, and means for deriving a voltage of modulation frequency from said modulator and for applying the same to said electrode to reduce the impedance of said tube, to thereby increase the power absorbed by such tube, only in response to the appearance at said device of modulating signal amplitudes below a predetermined amplitude.

6. In combination, an electron discharge device of the magnetron type, a useful load coupled to the output of said device, an absorption-type tube coupled to the output of said device in parallel to said load, said tube having therein a voltage-responsive electrode for controlling the effective impedance thereof, a modulator coupled to the anode circuit of said device, means for applying a modulating signal to said modulator to vary the anode current of said device to amplitude modulate the output thereof, and means for deriving a voltage of modulation frequency from said modulator and for applying the same to said electrode to reduce the impedance of said tube, to thereby increase the power absorbed by such tube and to reduce the power supplied to said load, only in response to the appearance at said derive of modulating signal amplitudes below a predetermined amplitude.

7. In combination, two electron discharge devices of the magnetron type, means coupling the outputs of said devices to a common load, a modulator coupled to the anode circuits of both devices, means for applying a modulating signal to said modulator to vary the anode currents of both devices to amplitude modulate the outputs thereof simultaneously and in phase, and means for modulating the two devices oppositely in timing by said modulating signal to vary the resultant power supplied to the common load.

8. In combination, two electron discharge devices of the magnetron type, means coupling the outputs of said devices to a common load, a modulator coupled to the anode circuits of both devices, means for applying a modulating signal to said modulator to vary the anode currents of both devices to amplitude modulate the outputs thereof simultaneously and in phase, means for maintaining the outputs of the two devices in phase quadrature relation to each other in the absence of a modulating signal, and means for modulating the two devices oppositely in timing by said modulating signal to vary the resultant power supplied to the common load.

9. In combination, two electron discharge devices of the magnetron type having similar characteristics, each device having voltage-responsive frequency controlling means coupled thereto, means coupling the outputs of said devices to a common load, a modulator coupled to the anode circuits of both devices, means for applying a modulating signal to said modulator to vary the anode currents of both devices to amplitude modulate the outputs thereof simultaneously and in phase, and means for supplying the modulating signal voltage anti-phasally to the frequency controlling means of the two devices to modulate such devices oppositely in timing to thereby vary the resultant power supplied to the common load.

10. In combination, two electron discharge devices of the magnetron type having similar characteristics, each device having voltage-responsive frequency controlling means coupled thereto, means coupling the outputs of said devices to a common load, a modulator coupled to the anode circuits of both devices, means for applying a modulating signal to said modulator to vary the anode currents of both devices to amplitude modulate the outputs thereof simultaneously and in phase, means for maintaining the outputs of the two devices in phase quadrature relation to each other in the absence of a modulating signal, and means for supplying the modulating signal voltage anti-phasally to the frequency controlling means of the two devices to modulate such devices oppositely in timing to thereby vary the resultant power supplied to the common load.

11. In combination, two electron discharge devices of the magnetron type having their outputs coupled to a common load, a modulator coupled to the anode circuit of one device, means for applying a modulating signal to said modulator to vary the anode current of said one device to amplitude modulate the output thereof, and means for maintaining the outputs of the two devices in antiphasal relation to each other.

12. In combination, two electron discharge devices of the magnetron type having their outputs coupled to a common load, each device having voltage-responsive frequency controlling means coupled thereto, a modulator coupled to the anode circuit of one device, means for applying a modulating signal to said modulator to vary the anode current of said one device to amplitude modulate the output thereof, means for developing a control voltage in response to a phase difference of other than 180° between the outputs of the two devices, and means for applying said voltage to one of said frequency controlling means.

13. In combination, two electron discharge devices of the magnetron type having their outputs coupled to a common load, each device having voltage-responsive frequency controlling means coupled thereto, one of said devices being of low power as compared to the other device, a modulator coupled to the anode circuit of the high power device, means for applying a modulating signal to said modulator to vary the anode current of the high power device to amplitude modulate the output thereof, means for comparing the phases of the outputs of the two devices and for producing a control voltage in response to a phase difference of other than 180° therebetween, and means for applying said voltage to one of said frequency controlling means.

14. In combination, an electron discharge device of the magnetron type, a useful load coupled to the output of said device, a modulator coupled to the anode circuit of said device, means for applying a modulating signal to said modulator to vary the anode current of said device to amplitude modulate the output thereof, said device having a non-linear load voltage-applied modulator input voltage modulation characteristic, voltage-responsive power absorbing means coupled to the output of said device in parallel to said load, and means for deriving a voltage of modulation frequency from said modulator and for applying the same to said absorbing means for controlling the power absorbed thereby, to thereby effect at least partial compensation in said load for the non-linearity of said modulation characteristic.

15. In combination, an electron discharge device of the magnetron type, a useful load coupled to the output of said device, a modulator coupled to the anode circuit of said device, means for applying a modulating signal to said modulator to vary the anode current of said device to amplitude modulate the output thereof, said device having a non-linear load voltage-applied modulator input voltage modulation characteristic, an absorption-type tube coupled to the output of said device in parallel to said load, and means responsive to said modulating signal for controlling the power absorbed by said tube, to thereby effect at least partial compensation in said load for the non-linearity of said modulation characteristic.

16. In combination, an electron discharge device of the magnetron type, a useful load coupled to the output of said device, a modulator coupled to the anode circuit of said device, means for applying a modulating signal to said modulator to vary the anode current of said device to amplitude modulate the output thereof, said device having a non-linear load voltage-applied modulator input voltage characteristic, an absorption-type tube coupled to the output of said device in parallel to said load, said tube having therein a voltage-responsive electrode for controlling the power absorbed by such tube, and means for deriving a voltage of modulation frequency from said modulator and for applying the same to said electrode to control the power absorbed by said tube, to thereby effect at least partial compensation in said load for the non-linearity of said modulation characteristic.

17. In combination, an electron discharge device of the magnetron type having voltage-responsive frequency controlling means coupled thereto, means for comparing the output frequency of said device with a reference frequency and for producing a voltage in response to a difference between the two compared frequencies, means for applying said voltage to said frequency controlling means to control the device output frequency, a modulator coupled to the anode circuit of said device, means for applying a modulating signal to said modulator to vary the anode current of said device to amplitude modulate the output thereof, means coupled to said modulator for deriving a voltage of modulation frequency therefrom, and means for applying said last-named voltage to said frequency controlling means to oppose the output frequency changes of said device produced by variations in the anode current thereof.

18. In combination, an electron discharge device of the magnetron type having an anode and a main cathode, an auxiliary electron-emitting cathode in said device, means for supplying unidirectional operating potentials to said auxiliary cathode and said anode, whereby an auxiliary electron beam is produced between said auxiliary cathode and said anode, said auxiliary beam being coupled into the interior of said device for controlling the output frequency thereof, a voltage-responsive control electrode in the path of said auxiliary beam for controlling the same, means for comparing the output frequency of said device with a reference frequency and for producing a voltage in response to a difference between the two compared frequencies, means for applying said voltage to said control electrode to control the total energy of said auxiliary electron beam, thereby to control the device output frequency, means for supplying unidirectional operating potentials to said main cathode and said anode, a modulator in the anode-cathode circuit of said device, means for applying a modulating signal to said modulator to vary the anode current of said device to amplitude modulate the output thereof, means coupled to said modulator for deriving a voltage of modulation frequency therefrom, and means for applying said voltage to said control electrode to control the total energy of said auxiliary electron beam, thereby to oppose the output frequency changes of said device produced by variations in the anode current thereof.

19. The combination defined in claim 18, wherein the last-named applying means includes means for varying the phase and amplitude of the modulation frequency voltage applied to the control electrode.

20. In combination, an electron discharge device of the magnetron type, variable-impedance power absorbing means coupled to the output of said device, a modulator coupled to the anode circuit of said device, means for applying a modulating signal to said modulator to vary the anode current of said device to amplitude modulate the output thereof, and means responsive to said modulating signal for changing the effective impedance of said absorbing means, to thereby change the power absorbed by such absorbing means, only in response to the appearance at said device of modulating signal amplitudes outside a predetermined value.

21. In combination, an electron discharge device of the magnetron type having voltage-responsive frequency controlling means coupled thereto, means for comparing the output frequency of said device with a reference frequency and for producing a voltage in response to a difference between the two compared frequencies, means for applying said voltage to said frequency controlling means to control the device output frequency, variable-impedance power absorbing means coupled to the output of said device, a modulator coupled to the anode circuit of said device, means for applying a modulating signal to said modulator to vary the anode current of said device to amplitude modulate the output thereof, and means responsive to said modulating signal for changing the effective impedance of said absorbing means, to thereby change the power absorbed by such absorbing means, only in response to the appearance at said device of modulating signal amplitudes outside a predetermined value.

22. In combination, an electron discharge device of the magnetron type, an absorption-type tube coupled to the output of said device, said tube comprising a resonant cavity containing a grid-controlled electron beam, a modulator coupled to the anode circuit of said device, means for applying a modulating signal to said modulator to vary the anode current of said device to amplitude modulate the output thereof, and means for deriving a voltage of modulation frequency from said modulator and for applying the same to the control grid for said beam to reduce the impedance of said tube, to thereby increase the power absorbed by such tube, only in response to the appearance at said device of modulating signal amplitudes below a predetermined value.

23. In combination, an electron discharge device of the magnetron type having an anode and a cathode, means for supplying unidirectional operating potentials to said cathode and said anode, an absorption-type tube coupled to the output of said device, said tube comprising a resonant cavity containing a grid-controlled electron beam, a modulator coupled to the cathode of said device, means for applying a modulating signal to said modulator to vary the anode current of said device to amplitude modulate the output thereof, and a coupling including electronic devices between said cathode and the control grid for said beam, for applying a voltage of modulation frequency to such grid to reduce the impedance of said tube, to thereby increase the power absorbed by such tube, only in response to the appearance at said device of modulating signal amplitudes below a predetermined value.

24. In combination, an electron discharge device of the magnetron type having an anode and a cathode and having voltage-responsive frequency controlling means coupled thereto, means for comparing the output frequency of said device with a reference frequency and for producing a voltage in response to a difference between the two compared frequencies, means for applying said voltage to said frequency controlling means to control the device output frequency, means for supplying unidirectional operating potentials to said cathode and said anode, an absorption-type tube coupled to the output of said device, said tube comprising a resonant cavity containing a grid-controlled electron beam, a modulator coupled to the cathode of said device, means for applying a modulating signal to said modulator to vary the anode current of said device to amplitude modulate the output thereof, and a coupling including electronic devices between said cathode and the control grid for said beam, for applying a voltage of modulation frequency to such grid to reduce the impedance of said tube, to thereby increase the power absorbed by such tube, only in response to the appearance at said device of modulating signal amplitudes below a predetermined value.

25. In combination, two electron discharge devices of the magnetron type each having a voltage-responsive frequency controlling means coupled thereto, means for separately comparing the output frequency of each of said devices with a reference frequency and for producing a voltage in response to a difference between the two frequencies being compared, means for applying the voltage so produced to the frequency controlling means of that device having an output frequency differing from the reference frequency to control the output frequency of such device, means coupling the outputs of said devices to a common load, a modulator coupled to the anode circuits of both devices, means for applying a modulating signal to said modulator to vary the anode currents of both devices to amplitude modulate the outputs thereof simultaneously and in phase, and means for modulating the two devices oppositely in timing by said modulating signal to vary the resultant power supplied to the common load.

26. In combination, two electron discharge devices of the magnetron type each having an anode and a main cathode and each having also an auxiliary electron-emitting cathode therein, means for supplying a unidirectional operating potential between each auxiliary cathode and its respective anode, whereby an auxiliary electron beam is produced between each auxiliary cathode and its respective anode, each auxiliary beam being coupled into the interior of its respective device for controlling the output frequency thereof, a voltage-responsive control electrode in the path of each auxiliary beam for controlling the same, means for supplying a unidirectional operating potential between each main cathode and its respective anode, means coupling the outputs of said devices to a common load, a modulator in the anode-cathode circuits of both devices, means for applying a modulating signal to said modulator to vary the anode currents of both devices to amplitude modulate the outputs thereof simultaneously and in phase, means coupled to said modulator for deriving voltages of modulation frequency therefrom, and means for applying the modulation frequency voltages oppositely to the two control electrodes, to modulate the two devices oppositely in timing by said modulating signal.

27. In combination, two electron discharge devices of the magnetron type each having an anode and a main cathode and each having also an auxiliary electron-emitting cathode therein, means for supplying a unidirectional operating potential between each auxiliary cathode and its respective anode, whereby an auxiliary electron beam is produced between each auxiliary cathode and its respective anode, each auxiliary beam being coupled into the interior of its respective device for controlling the output frequency thereof, a voltage-responsive control electrode in the path of each auxiliary beam for controlling the same, means for separately comparing the output frequency of each of said devices with a reference frequency and for producing a voltage in response to a difference between the two frequencies being compared, means for applying the voltage so produced to the control electrode of that device having an output frequency differing from the reference frequency to control the output frequency of such device, means for supplying a unidirectional operating potential between each main cathode and its respective anode, means coupling the outputs of said devices to a common load, a modulator in the anode-cathode circuits of both devices, means for applying a modulating signal to said modulator to vary the anode currents of both devices to amplitude modulate the outputs thereof simultaneously and in phase, means coupled to said modulator for deriving voltages of modulation frequency therefrom, and means for applying the modulation frequency voltages oppositely to the two control electrodes, to modulate the two devices oppositely in timing by said modulating signal.

JOHN S. DONAL, Jr.

REFERENCES CITED

The following references are of record in the file of this patent:

UNITED STATES PATENTS

| Number | Name | Date |
|---|---|---|
| 2,227,595 | Linder | Jan. 7, 1941 |
| 2,446,531 | Derby | Aug. 10, 1948 |
| 2,490,007 | Peters | Nov. 29, 1949 |
| 2,534,503 | Donal | Dec. 19, 1950 |